(12) United States Patent
Rodmell

(10) Patent No.: US 9,916,766 B2
(45) Date of Patent: Mar. 13, 2018

(54) METHODS, SYSTEMS, AND COMPUTER PROGRAM PRODUCTS FOR USER PACED LEARNING BASED ON HISTORICAL PROGRAMMING ERRORS AND SOLUTIONS USING ELECTRONIC FLASH CARDS

(71) Applicant: CA, INC., Islandia, NY (US)

(72) Inventor: Mark Daniel Rodmell, Prague (CZ)

(73) Assignee: CA, INC., Islandia, NY (US)

( * ) Notice: Subject to any disclaimer, the term of this patent is extended or adjusted under 35 U.S.C. 154(b) by 846 days.

(21) Appl. No.: 14/334,832

(22) Filed: Jul. 18, 2014

(65) Prior Publication Data
US 2016/0019800 A1 Jan. 21, 2016

(51) Int. Cl.
G09B 7/00 (2006.01)
G09B 5/02 (2006.01)
G09B 7/02 (2006.01)
G09B 7/06 (2006.01)
G06Q 50/20 (2012.01)

(52) U.S. Cl.
CPC .............. G09B 5/02 (2013.01); G06Q 50/20 (2013.01); G09B 7/02 (2013.01); G09B 7/06 (2013.01)

(58) Field of Classification Search
CPC . G09B 19/00; G09B 5/02; G09B 7/02; G09B 7/06; G06F 17/30336; G06F 17/30864; G06Q 50/20
See application file for complete search history.

(56) References Cited

U.S. PATENT DOCUMENTS

| | | | | |
|---|---|---|---|---|
| 4,772,206 A * | 9/1988 | Kerr | ........................ | G06F 17/246 434/118 |
| 5,732,277 A * | 3/1998 | Kodosky | ........... | G01R 31/31912 715/759 |
| 5,760,788 A * | 6/1998 | Chainini | ............. | G09B 19/0053 345/474 |
| 7,757,234 B2 * | 7/2010 | Krebs | .................... | G06F 9/4446 715/700 |
| 2002/0161732 A1 * | 10/2002 | Hopp | ........................ | G09B 7/02 706/25 |
| 2003/0131337 A1 * | 7/2003 | Perumainar | ........ | G09B 19/0053 717/100 |
| 2004/0009462 A1 * | 1/2004 | McElwrath | ............... | G09B 7/02 434/350 |
| 2004/0205578 A1 * | 10/2004 | Wolff | ................... | G06F 17/2247 715/239 |
| 2007/0101331 A1 * | 5/2007 | Krebs | .................... | G06F 9/4446 718/101 |
| 2008/0046860 A1 * | 2/2008 | Kratschmer | .......... | G06F 11/008 717/101 |
| 2008/0155538 A1 * | 6/2008 | Pappas | ................... | G06Q 30/02 718/100 |
| 2008/0189092 A1 * | 8/2008 | Hagelin | ................. | G05B 17/02 703/8 |

(Continued)

*Primary Examiner* — Nathan Hillery
(74) *Attorney, Agent, or Firm* — Sage Patent Group

(57) ABSTRACT

A method includes performing operations as follows on a processor: indexing a database of records for a topic based on a training suitability criterion, the records comprising programming errors and associated resolutions; generating a deck of electronic flash cards containing training questions thereon, respectively, from the database of records based on the training suitability criterion; and displaying the electronic flash cards.

33 Claims, 12 Drawing Sheets

---

The following code:

.
.
.
.
.

<insert Failing Code from record - editable>

.
.
.
.
.

Results in the error: <insert the Error Message>

Modify the code to correct this error.

(56) References Cited

U.S. PATENT DOCUMENTS

| | | | | |
|---|---|---|---|---|
| 2009/0293040 A1* | 11/2009 | DeBoer | .................... | G06F 8/60 |
| | | | | 717/109 |
| 2011/0091859 A1* | 4/2011 | Hall | ........................ | G09B 7/08 |
| | | | | 434/350 |
| 2012/0288846 A1* | 11/2012 | Hull | ........................ | G09B 5/14 |
| | | | | 434/365 |
| 2014/0156557 A1* | 6/2014 | Zeng | .................. | G06Q 10/0631 |
| | | | | 705/348 |

* cited by examiner

The following code:

·
·
·
·
·
·

<insert Failing Code from record - editable>

·
·
·
·
·
·

Results in the error: <insert the Error Message>

Modify the code to correct this error.

*FIG. 7*

The following code:

.
.
.
.
.
.
<insert Failing Code from record>
.
.
.
.
.
.

Results in the error: <insert the Error Message>

Which of the following options would successfully resolve the error?

A. <Insert Failed Corrected Code from associated unresolved record 1>
B. <Insert Failed Corrected Code from associated unresolved record 2>
C. <Insert Corrected Code from original resolved record>

*FIG. 8*

Age: 1 year, 6 Months

Tags: 2

Last Tag Age: 2 Months

Error Messages:

| File | Line | Message |
|---|---|---|
| ..\..\include\PriorityQueue.h | 16 | error: expected ')' before '*' token |
| ..\..\include\PriorityQueue.h | 49 | warning: non-static const member 'const int PriorityQueue::infiniteDist' in class with... |
| C:\Users\rodna07\Documents\C++ Course\Graph\src\Graph.cpp | | In constructor 'Graph::Graph(int, double, int, int)': |
| C:\Users\rodna07\Documents\C++ Course\Graph\src\Graph.cpp | 62 | error: no matching function for call to 'PriorityQueue::PriorityQueue(Graph* const)' |
| C:\Users\rodna07\Documents\C++ Course\Graph\src\Graph.cpp | 62 | note: candidates are: |

Failing Code:

```
define PRIORITYQUEUE_H using namespace std;

//-------------------------------------
// Class PriorityQueue wraps a vector of graph
// To the caller, the structure appears as a qu
// in our ShortestPath class to monitor the pri
//-------------------------------------
class PriorityQueue
{ public:

PriorityQueue(Graph*);

int get_previous_node(int);

void set_previous_node(int, int);

int get_node_value(int);
```

Corrected Code:

```
#ifndef PRIORITYQUEUE_H
define PRIORITYQUEUE_H using namespace std;

class Graph;

//-------------------------------------
// Class PriorityQueue wraps a vector of graph
// To the caller, the structure appears as a qu
// in our ShortestPath class to monitor the pri
//-------------------------------------
class PriorityQueue
{ public:

PriorityQueue(Graph*);

int get_previous_node(int);
```

*FIG. 9*

The following code:

```
define PRIORITYQUEUE_H using namespace std;

//----------------------------------------
// [illegible comment]
// [illegible comment]
// [illegible comment]
//----------------------------------------
class PriorityQueue
{ public:

PriorityQueue(Graph*);

int get_previous_node(int);

void set_previous_node(int, int);

int get_node_value(int);
```

Results in the error: **expected ')' before '*'**

Which of the following options would successfully resolve the error?

A. Adding Class Graph;
B. Changing PriorityQueue(Graph*) to PriorityQueue(Graph)
C. Changing PriorityQueue(Graph*) to PriorityQueue(Graph3D*)

Answer

*FIG. 10*

The following code:

```
define PRIORITYQUEUE_H using namespace std;

//------------------------------------------------
// Class PriorityQueue wraps a vector of graph
// In the caller, the structure appears as a Q
// is not StoragePath class to monitor the Qu
//
class PriorityQueue
{ public:

PriorityQueue(Graph*);

int get_previous_node(int);

void set_previous_node(int, int);

int get_node_value(int);
```

Results in the error: **expected ')' before '*'**

Modify the code to correct this error.

[Answer]

*FIG. 11*

METHODS, SYSTEMS, AND COMPUTER PROGRAM PRODUCTS FOR USER PACED LEARNING BASED ON HISTORICAL PROGRAMMING ERRORS AND SOLUTIONS USING ELECTRONIC FLASH CARDS

BACKGROUND

The present disclosure relates to computing systems, and, in particular, to computing systems that are used to deliver educational or training material.

Ongoing education and training of employees may be important to the success or a business or company. An employee's ability to absorb and understand new concepts may affect that employee's personal success directly and the success of the company indirectly. Both personal and organizational development can stagnate, however, without an effective means of delivering educational and training materials.

Conventional education techniques focus on periods of intense training. These training sessions may be in the form of 30 minute webinars or may be offsite seminars that last for several days and involve numerous classroom and practical sessions. One common attribute of these conventional education techniques is that the student is expected to dedicate a block of time to assimilate the material.

While conventional education techniques can be effective, they may introduce a hidden cost: While students set aside time to attend or view lectures, participate in breakout groups, and the like, they are not able to do anything else, i.e., make progress on their daily work tasks. Indeed, instructors often discourage students from checking emails associated with work or other distractions so that the students' full attentions can be focused on learning the course material. When students do return to their daily jobs, there is often a readjustment phase associated with becoming reacquainted with daily tasks and catching up on what was missed while attending the educational course. The readjustment phase may be particularly difficult for individuals who work in high complex and/or technical roles.

In the field of software development, numerous books, education programs, and videos attempt to teach both the basic principles of a programming language, such as C++, as well as more advanced features of the language. While the quality of such training materials and programs may be generally high, the effort involved to create the training materials may be extensive and the resulting training materials may not always be tailored to the broad range of real-world scenarios that a software developer may encounter on the job.

There may also be a shortfall when a new employee begins work on an established or legacy project for the first time. The employee may know the programming language well, but not the design, layout, and/or common pitfalls associated with the legacy project. Training is often done on a trial-and-error basis where the developer learns on the job. In some cases, the new developer may be shadowed by a more senior developer and/or may be given internal project documentation to study.

SUMMARY

In some embodiments of the inventive subject matter, a method comprises performing operations as follows on a processor: indexing a database of records for a topic based on a training suitability criterion, the records comprising programming errors and associated resolutions; generating a deck of electronic flash cards containing training questions thereon, respectively, from the database of records based on the training suitability criterion; and displaying the electronic flash cards.

In other embodiments, a system comprises a processor and a memory coupled to the processor and comprising computer readable program code embodied in the memory that when executed by the processor causes the processor to perform operations comprising: indexing a database of records for a topic based on a training suitability criterion, the records comprising programming errors and associated resolutions; generating a deck of electronic flash cards containing training questions thereon, respectively, from the database of records based on the training suitability criterion; and displaying the electronic flash cards.

In further embodiments, a computer program product comprises a tangible computer readable storage medium comprising computer readable program code embodied in the medium that when executed by a processor causes the processor to perform operations comprising: indexing a database of records for a topic based on a training suitability criterion, the records comprising programming errors and associated resolutions; generating a deck of electronic flash cards containing training questions thereon, respectively, from the database of records based on the training suitability criterion; and displaying the electronic flash cards.

It is noted that aspects of the inventive concepts described with respect to one embodiment may be incorporated in a different embodiments although not specifically described relative thereto. That is, all embodiments and/or features of any embodiments can be combined in any way and/or combination. These and other objects and/or aspects of the present inventive concepts are explained in detail in the specification set forth below.

Other methods, systems, articles of manufacture, and/or computer program products according to embodiments of the inventive subject matter will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims.

BRIEF DESCRIPTION OF THE DRAWINGS

Other features of exemplary embodiments will be more readily understood from the following detailed description of specific embodiments thereof when read in conjunction with the accompanying drawings, in which:

FIGS. 7 and 8 are block diagrams that illustrate electronic flash card templates according to some embodiments of the inventive subject matter;

FIG. 9 is a diagram that illustrates a record taken from a database of programming errors and associated resolutions for a topic;

FIG. 10 is a block diagram that illustrates an electronic flash card containing a training question based on the record of FIG. 9 and the template of FIG. 8;

FIG. 11 is a block diagram that illustrates an electronic flash card containing a training question based on the record of FIG. 9 and the template of FIG. 7.

DETAILED DESCRIPTION

Figure 1:
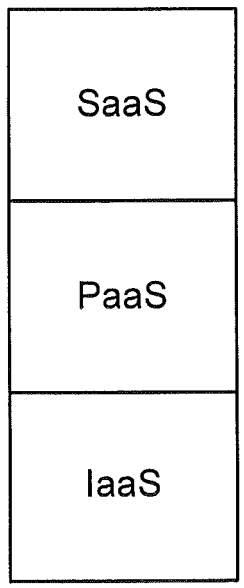
FIG. 1 is a block diagram that illustrates cloud computing paradigm.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

As used herein, data are raw, unorganized facts that need to be processed. Data can be something simple and seemingly random and useless until it is organized. When data are processed, organized, structured or presented in a given context so as to make it useful, it is called information.

Some embodiments of the inventive subject matter stem from a realization that conventional education techniques typically require a student to devote a block of time to focus on the subject matter being taught whether through a live lecture, online webinar, breakout groups where the student participates in exercises, or the like. By focusing solely on the subject matter being taught, however, the student is often unable to or discouraged from multi-tasking and devoting some attention to other work or tasks. Moreover, in the field of software development for example, training materials may not always be tailored to the range of real-world scenarios that a software developer may encounter on the job, such as common pitfalls associated with a legacy project.

Some embodiments of the inventive subject matter may provide training methods, systems, and computer program products that make use of a database of records for a topic where the records comprise programming errors and associated resolutions. The database of records may be indexed based on one or more training suitability criterion to obtain the records corresponding to the errors and resolutions that may be the most effective in training. A deck of electronic flash cards may be generated based on the records that are determined as having the greatest training suitability. Because the electronic flash cards are generated based on a historical database of actual errors and resolutions, the training material may be more closely related to the real-life difficulties encountered by software developers. The electronic flash card generation may be automated and the electronic flash cards reviewed by a subject matter expert to eliminate errors in the questions/answers. Automatically generating the flash cards based on the database of historical errors and resolutions may save the time of an instructor or training course developer in developing training/educational materials.

The use of electronic flash cards may allow a software developer to receive educational information at a pace that allows the developer to absorb the information while also maintaining focus on one or more other tasks. Such a system may allow a company or business, for example, to provide training materials to their employees while allowing their employees to carry out their everyday work roles. The employees' efficiency in carrying out their tasks may be reduced slightly or a negligible amount while still learning the new material as the new material may be learned and retained while taking periodic breaks from their everyday tasks. Such an approach is generally more efficient than having employees stop working entirely on their regular jobs to focus entirely on training and then return to their regular jobs once training is complete as there is a readjustment phase where the employees need to get reacquainted with what they were working on before stopping to focus on the education or training material.

In accordance with various embodiments of the inventive subject matter, the student or user can adjust the pace at which the training questions are presented. The questions may comprise multiple choice and/or short answer questions. The user may provide input to set the ratio of multiple choice questions to short answer questions. The system may keep track of a user's score based on the number of questions answered correctly/incorrectly to provide the user and/or a manager associated with the user feedback on how well the user is learning the material. Decks of electronic flashcards may be developed for a variety of topics having a historical database of errors and associated resolutions allowing course developers to develop a curriculum of educational materials for training users.

Some embodiments of the inventive subject matter may provide a user paced learning environment based on historical programming errors and resolutions through the cloud. Cloud computing is a computing paradigm where shared resources, such as processor(s), software, and information, are provided to computers and other devices on demand typically over a network, such as the Internet. In a cloud computing environment, details of the computing infrastructure, e.g., processing power, data storage, bandwidth, and/or other resources are abstracted from the user. The user does not need to have any expertise in or control over such computing infrastructure resources. Cloud computing typically involves the provision of dynamically scalable and/or virtualized resources over the Internet. A user may access and use such resources through the use of a Web browser. A typical cloud computing provider may provide an online application that can be accessed over the Internet using a browser. The cloud computing provider, however, maintains the software for the application and some or all of the data associated with the application on servers in the cloud, i.e., servers that are maintained by the cloud computing provider rather than the users of the application.

FIG. 1 illustrates a conventional cloud service model that includes Infrastructure as a Service (IaaS), Platform as a Service (PaaS), and Software as a Service (SaaS). Infrastructure as a Service, delivers computer infrastructure—typically a platform virtualization environment—as a service. Rather than purchasing servers, software, data-center space or network equipment, clients instead buy those resources as a fully outsourced service. Suppliers typically bill such services on a utility computing basis and the amount of resources consumed. Platform as a Service delivers a computing platform as a service. It provides an environment for the deployment of applications without the need for a client to buy and manage the underlying hardware and software layers. Software as a Service delivers software services over the Internet, which reduces or eliminates the need for the client to install and run an application on its own computers, which may simplify maintenance and support.

Virtualized computing environments may be used to provide computing resources to end users. In a cloud computing environment, the physical hardware configuration is hidden from the end user. Cloud computing systems may include servers, network storage devices, routers, gateways, communication links, and other devices. Because the physical hardware and software platforms on which cloud computing system is implemented are hidden within a "cloud," they can be managed, upgraded, replaced or otherwise changed by a system administrator without the customer being aware of or affected by the change.

In a typical cloud computing environment, applications may be executed on virtual machines, which are isolated guest operating systems installed within a host system. Virtual machines are typically implemented with either software emulation or hardware virtualization, or both. A single hardware and/or software platform may host a number of virtual machines, each of which may have access to some portion of the platform's resources, such as processing resources, storage resources, etc.

Figure 2:
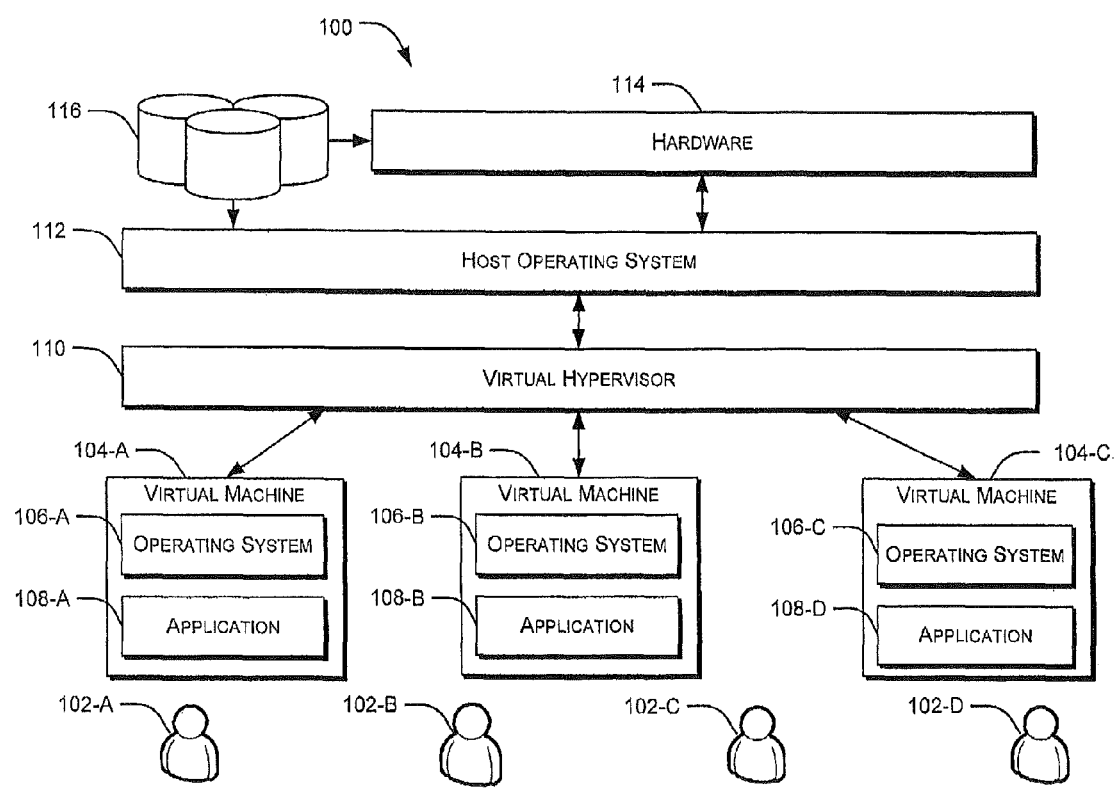
FIG. 2 is a block diagram that illustrates a virtualized computing environment.

FIG. 2 illustrates an exemplary server system 100 for a virtualized computing environment in which the inventive subject matter of the present disclosure can function. The server system 100 generally hosts one or more virtual machines 104 (hereafter virtual machine 104), each of which runs a guest operating system 106 and application 108. The computing needs of users 102 drive the functionality of the virtual machines 104. A virtual hypervisor 110 provides an interface between the virtual machines 104 and a host operating system 112 and allows multiple guest operating systems 106 and associated applications 108 to run concurrently. The host operating system 112 handles the operations of a hardware platform 114 capable of implementing virtual machines 104. A data storage space 116 may be accessed by the host operating system 112 and is connected to the hardware platform 114.

The hardware platform 114 generally refers to any computing system capable of implementing virtual machines 104, which may include, without limitation, a mainframe, personal computer (PC), micro-computer, handheld computer, mobile computing platform, server, or any other appropriate computer hardware. The hardware platform 114 may include computing resources, such as a central processing unit (CPU); networking controllers; communication controllers; a display unit; a program and data storage device; memory controllers; input devices (e.g., a keyboard, a mouse, etc.) and output devices, such as printers. The CPU may be any conventional processor, such as the AMD Athlon™ 64, or Intel® Core™ Duo.

The hardware platform 114 may be further connected to the data storage space 116 through serial or parallel connections. The data storage space 116 may be any suitable device capable of storing computer-readable data and instructions, and it may include logic in the form of software applications, random access memory (RAM), or read only memory (ROM), removable media, or any other suitable memory component. According to the illustrated embodiment, the host operating system 112 stands between the hardware platform 114 and the users 102 and is responsible for the management and coordination of activities and the sharing of the computing resources. In other embodiments, the virtual hypervisor runs directly on the hardware 114 without the intervening host operating system 112.

Although some embodiments of the computer system 100 can be configured to operate as a computer server, the computer system 100 is not limited thereto and can be configured to provide other functionality, such as data processing, communications routing, etc.

Besides acting as a host for computing applications that run on the hardware platform 114, the host operating system 112 may operate at the highest priority level in the server 100, executing instructions associated with the hardware platform 114, and it may have exclusive privileged access to the hardware platform 114. The priority and privileged access of hardware resources affords the host operating system 112 exclusive control over resources and instructions, and may preclude interference with the execution of different application programs or the operating system. The host operating system 112 creates an environment for implementing a virtual machine, hosting the "guest" virtual machine. One host operating system 112 is capable of implementing multiple isolated virtual machines simultaneously.

A virtual hypervisor 110 (which may also be known as a virtual machine monitor or VMM) runs on the host operating system 112 and provides an interface between the virtual machines 104 and the hardware platform 114 through the host operating system 112. The virtual hypervisor 110 virtualizes the computing system resources and facilitates the operation of the virtual machines 104. The hypervisor 110 may provide the illusion of operating at the highest priority level to the guest operating systems 106. The virtual hypervisor 110 maps the guest operating system's priority level to a priority level lower than the top most priority level. As a result, the virtual hypervisor 110 can intercept the guest operating system 106 to execute instructions that require virtualization assistance. Alternatively, the virtual hypervisor 110 may emulate or actually execute the instructions on behalf of the guest operating system 106. Software operations permitting indirect interaction between the guest operating system 106 and the physical hardware platform 114 are also performed by the virtual hypervisor 110.

Virtual machines 104 present a virtualized environment to guest operating systems 106, which in turn provide an operating environment for applications 108 and other software constructs.

Figure 3:
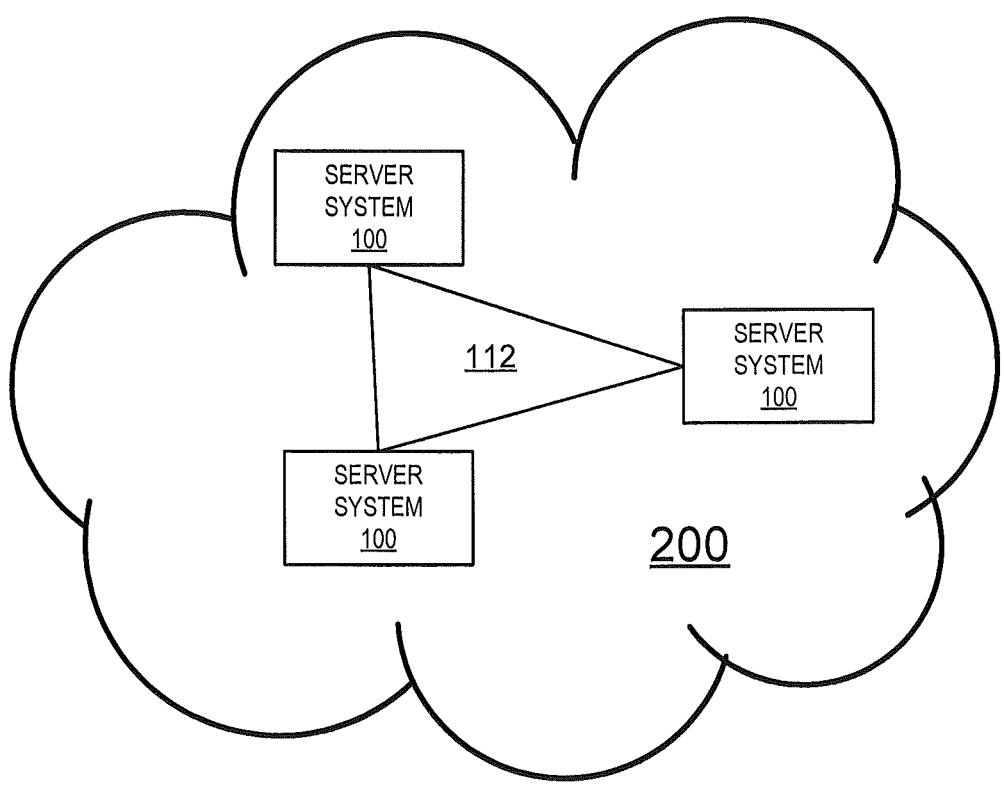
FIG. 3 is a block diagram that illustrates a cloud computing environment.

Referring to FIG. 3, a virtualized computing environment 200 (referred to generally as cloud 200) may include one or more server systems 100 that may include one or more electronic computing devices operable to receive, transmit, process, and store data. For example, the servers in the cloud 200 may include one or more general-purpose PCs, Macintoshes, micro-computers, workstations, Unix-based computers, server computers, one or more server pools, or any other suitable devices. In certain embodiments, the cloud 200 may include a web server. In short, the cloud 200 may include any suitable combination of software, firmware, and hardware.

The cloud 200 may include a plurality of server systems 100 that are communicatively coupled via a network 112. The network 112 facilitates wireless or wireline communication, and may communicate using, for example, IP packets, Frame Relay frames, Asynchronous Transfer Mode (ATM) cells, voice, video, data, and other suitable information between network addresses. The network 112 may include one or more local area networks (LANs), radio access networks (RANs), metropolitan area networks (MANs), wide area networks (WANs), all or a portion of the global computer network known as the Internet, and/or any other communication system or systems at one or more locations. Although referred to herein as "server systems," it will be appreciated that any suitable computing device may be used.

Virtual machines and/or other objects in a virtualization environment can be grouped into logical clusters for management and/or operational purposes. For example, virtual machines can be grouped into clusters based on load balancing needs, security needs, redundancy needs, or any other needs as determined by a system administrator. The virtual machines grouped within a cluster may or may not all be implemented on a single physical server. Any desired number of clusters can be defined subject to system limitations, and each of the clusters can include any desired number of virtual machines subject to server limitations.

Virtual machines can be deployed in particular virtualization environments and organized to increase the efficiency of operating and/or managing a virtual computing environment. For example, virtual machines may be grouped into clusters to provide load balancing across multiple servers.

Virtual machines within a same cluster can be managed by a single virtualization environment manager to have same or similar resource access privileges (e.g., processor utilization, priority, memory allocation, communication interface access privileges, etc.), while virtual machines within different clusters can have different resource access privileges.

Virtual machines that are deployed within a single cluster may share physical resources within a server. For example, virtual machines that are deployed within a single cluster may share physical memory, storage, communication facilities and other resources or services of a server. Whenever computing resources are shared, there is the possibility that one virtual machine could intentionally or unintentionally gain access to data of another virtual machine.

Figure 4:
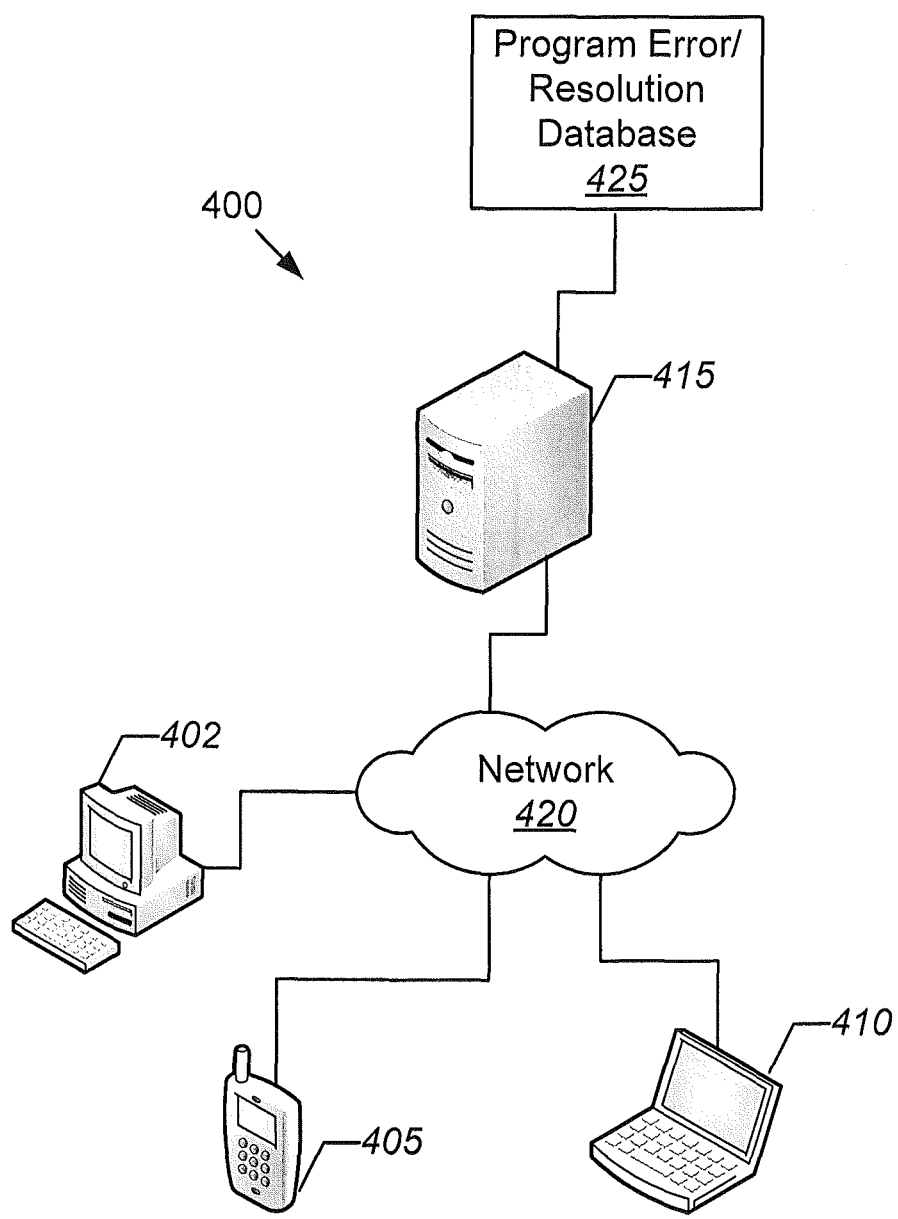
FIG. 4 is a block diagram of a user paced learning environment based on historical programming errors and resolutions in accordance with some embodiments of the present inventive subject matter.

Referring to FIG. 4, a user paced learning environment based on historical programming errors and resolutions 400, in accordance with some embodiments of the inventive subject matter, comprises end user devices 402, 405, and 410 that are coupled to a user paced learning server 415 via a network 420. The network 420 may be a global network, such as the Internet or other publicly accessible network. Various elements of the network 420 may be interconnected by a wide area network, a local area network, an Intranet, and/or other private network, which may not be accessible by the general public. Thus, the communication network 420 may represent a combination of public and private networks or a virtual private network (VPN). The network 420 may be a wireless network, a wireline network, or may be a combination of both wireless and wireline networks. The end user devices 402, 405, 410 may represent wired and/or wireless devices that provide a display for the end user and via which the end user may communicate with the user paced learning server 415.

The user paced learning server 415 is coupled to a program error/resolution database 425. As shown in FIG. 4, the user paced learning server 415 is coupled directly to the program error/resolution database 425. In other embodiments, the user paced learning server 415 and program error/resolution database 425 may be coupled using various types of network connections, such as those that may comprise network 420. The program error/resolution database 425 may store records that comprise errors encountered during build (e.g., compile, link, etc.) and/or run time for a topic along with the associated resolutions for these errors. The resolutions may include, but are not limited to, source code changes to a program, data changes to a program (e.g., header file changes), build or compile script changes (e.g., change which libraries are included in a build/compile), and the like. The topic may be associated with, but is not limited to, a software development project, a particular product, a programming language, and/or a programming lesson or technique. Multiple instances of the program error/resolution database 425 may be used to create databases containing error/resolution records for different topics. The program error/resolution database 425 may be implemented using any suitable database management system and database model (e.g., relational, network, object, etc.). Examples of a program error/resolution database 425 according to some embodiments of the inventive subject matter are described in U.S. patent application Ser. No. 14/222,045 entitled "DEVELOPMENT TOOLS FOR LOGGING AND ANALYZING SOFTWARE BUGS" filed Mar. 21, 2014 the disclosure of which is hereby incorporated herein by reference. The user paced learning server 415 may be configured to generate electronic flash cards from the database of records contained in the program error/resolution database 425 that have the greatest training suitability.

It will be appreciated that in accordance with various embodiments of the inventive subject matter, the user paced learning server 415 may be implemented as a single server, separate servers, or a network of servers either co-located in a server farm, for example, or located in different geographic regions.

As shown in FIG. 4, some embodiments according to the inventive subject matter can operate in a logically separated client side/server side-computing environment, sometimes referred to hereinafter as a client/server environment. The client/server environment is a computational architecture that involves a client process (i.e., client devices 402, 405 and 410) requesting service from a server process (i.e., user paced learning server 415). In general, the client/server environment maintains a distinction between processes, although client and server processes may operate on different machines or on the same machine. Accordingly, the client and server sides of the client/server environment are referred to as being logically separated. Usually, when client and server processes operate on separate devices, each device can be customized for the needs of the respective process. For example, a server process can "run on" a system having large amounts of memory and disk space, whereas the client process often "runs on" a system having a graphic user interface provided by high-end video cards and large-screen displays.

The clients and servers can communicate using a standard communications mode, such as Hypertext Transport Protocol (HTTP), SOAP, XML-RPC, and/or WSDL. According to the HTTP request-response communications model, HTTP requests are sent from the client to the server and HTTP responses are sent from the server to the client in response to an HTTP request. In operation, the server waits for a client to open a connection and to request information, such as a Web page. In response, the server sends a copy of the requested information to the client, closes the connection to the client, and waits for the next connection. It will be understood that the server can respond to requests from more than one client.

Although FIG. 4 illustrates an exemplary user paced learning environment based on historical programming errors and resolutions, it will be understood that embodiments of the inventive subject matter are not limited to such configurations, but are intended to encompass any configuration capable of carrying out the operations described herein.

Figure 5:
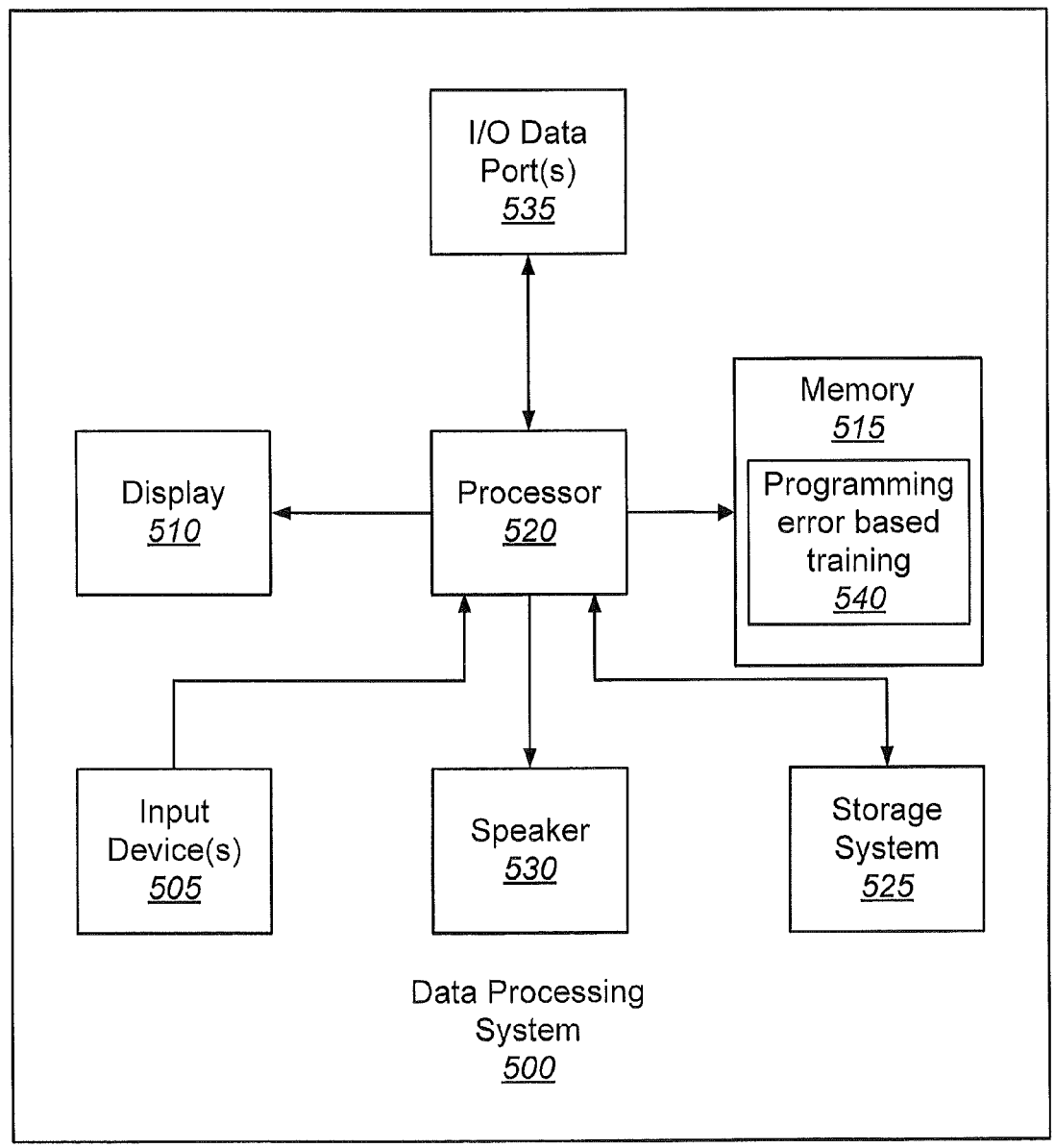
FIG. 5 is a block diagram that illustrates a data processing system that may be used to implement the user paced learning server of FIG. 4 according to some embodiments of the inventive subject matter.

FIG. 5 illustrates a data processing system 500 that may be used, for example, to implement the user paced learning server 415 of FIG. 4 and may include a module for providing a user paced learning course, in accordance with some embodiments of the inventive subject matter. The data processing system 500 comprises input device(s) 505, such as a keyboard or keypad, a display 510, and a memory 515 that communicate with a processor 520. The data processing system 200 may further comprise a storage system 525, a speaker 530, and an I/O data port(s) 535 that also communicate with the processor 520. The storage system 525 may include removable and/or fixed media, such as floppy disks, ZIP drives, hard disks, or the like as well as virtual storage such as a RAMDISK. The I/O data port(s) 535 may be used to transfer information between the data processing system 500 and another computer system or a network (e.g., the Internet). These components may be conventional components, such as those used in many conventional computing devices, and their functionality, with respect to conventional operations, is generally known to those skilled in the art. The memory 515 may be configured with a programming error based training module 540 that may provide functionality to make use of a database of records for a topic (i.e., program error/resolution database 425) where the records comprise programming errors and associated resolutions. The database of records may be indexed based on one or more training suitability criterion to obtain the records corresponding to the errors and resolutions that may be the most effective in training. A deck of electronic flash cards may be generated based on the records that are determined as having the greatest training suitability.

Figure 6:
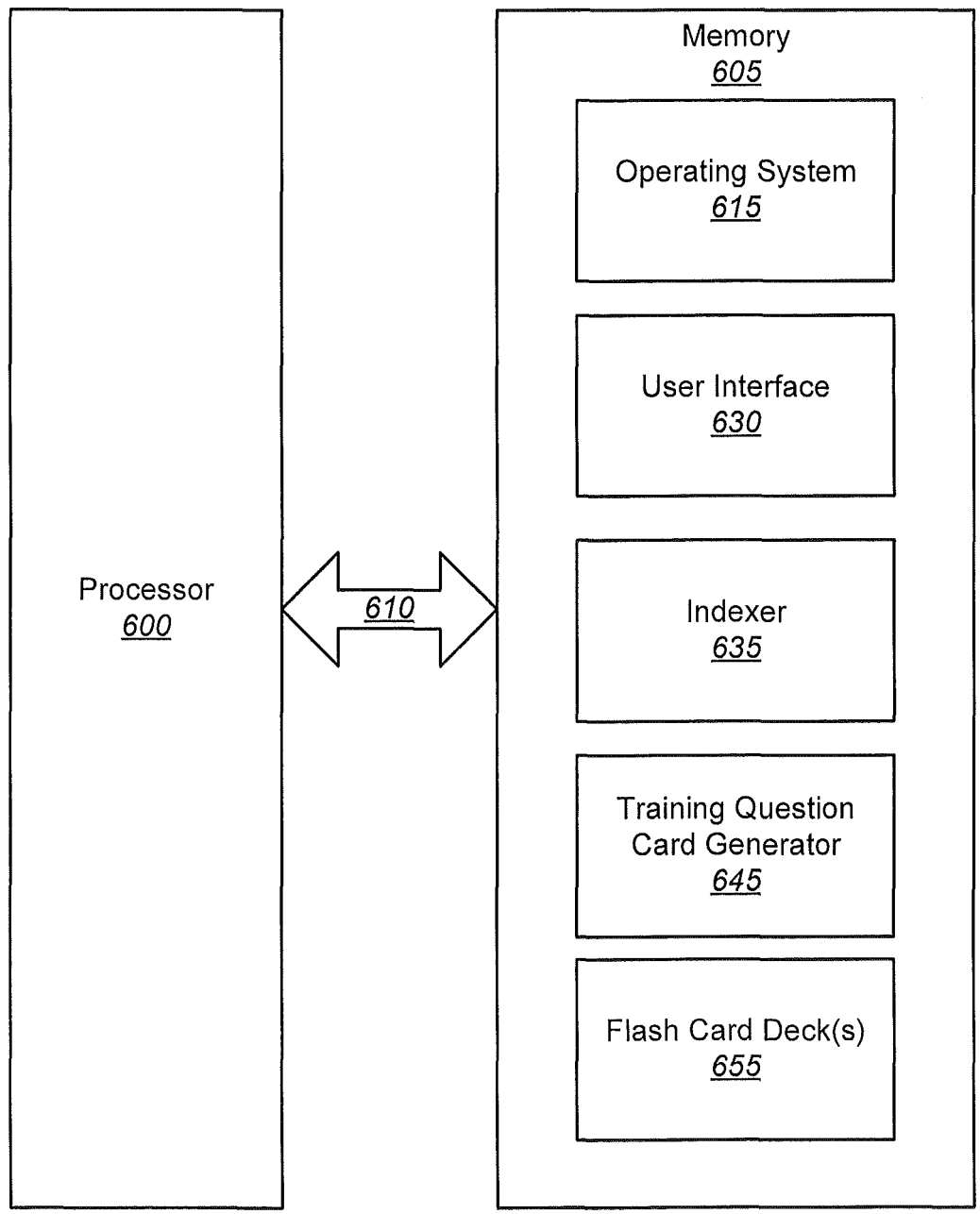
FIG. 6 is a block diagram that illustrates a software/hardware architecture for a user paced learning server in accordance with some embodiments of the present inventive subject matter.

FIG. 6 illustrates a processor 600 and memory 605 that may be used in embodiments of data processing systems, such as the data processing system 500 of FIG. 5, for implementing the user paced learning server 415 in accordance with some embodiments of the inventive subject matter. The processor 600 communicates with the memory 605 via an address/data bus 610. The processor 600 may be, for example, a commercially available or custom microprocessor. The memory 605 is representative of the one or more memory devices containing the software and data used to provide a user paced learning environment based on historical programming errors and resolutions in accordance with some embodiments of the inventive subject matter. The memory 605 may include, but is not limited to, the following types of devices: cache, ROM, PROM, EPROM, EEPROM, flash, SRAM, and DRAM.

As shown in FIG. 6, the memory 605 may contain five or more categories of software and/or data: an operating system 615, a user interface module 630, an indexer module 635, a training question card generator module 645, and a flash card deck(s) module 655. The operating system 615 generally controls the operation of the data processing system. In particular, the operating system 615 may manage the data processing system's software and/or hardware resources and may coordinate execution of programs by the processor 600. The user interface module 630 may be used to control the display on a user's device when interacting with the user paced learning server 415. Specifically, the user interface module 630 may be used to receive input from a user and may also allow the user to configure the screen with respect to how the electronic flash cards are displayed. For example, the user may provide input through the user interface module 630 to select a topic for training, to input answers to questions on the flash cards, whether multiple choice or short answer, and/or to select a ratio of multiple choice questions to short answer questions. The indexer module 635 may be configured to order the records in the program error/resolution database 425 for a topic. Typically, not all programming errors and their associated resolutions are good candidates for electronic flash cards to train a user. The indexer module 635 may order the programming error/resolution records in the program error/resolution database 425 for a topic in order based on one or more training suitability criterion.

The training card question generator module 645 may be configured to generate a deck of electronic flash cards for a topic, which contain training questions thereon from the records identified by the indexer module 635 as having the greatest training suitability. The deck may contain N electronic flash cards where the number N is, in some embodiments, provided by the user. The training question card generator 645 may generate electronic flash cards having a multiple choice and/or short answer format in accordance with various embodiments of the inventive subject matter. FIG. 7 illustrates an electronic flash card template that can be used to generate a short answer electronic flash card based on a record containing a programming error and resolution from the program error/resolution database 425 according to some embodiments of the inventive subject matter. FIG. 8 illustrates an electronic flash card template that can be used to generate a multiple choice electronic flash card based on a record containing a programming error and resolution from the program error/resolution database 425 according to some embodiments of the inventive subject matter. The flash card deck(s) module 655 may represent the various decks of electronic flash cards associated with different learning topics. There may one or more decks covering a single or multiple topics. Each deck may include one or more electronic flash cards containing multiple choice and/or short answer questions.

FIG. 9 is a diagram that illustrates a record taken from the program error/resolution database 425 that identifies a programming error along with an associated solution to the error according to some embodiments of the inventive subject matter. The record of FIG. 9 includes a tag field, which is indicative that the error and solution information contained in the error has been found relevant by one or more developers in resolving another error. Software developers may review the records contained in the program error/resolution database 425 when resolving an error and tag those records that are relevant in coming up with a solution to a current error. FIG. 10 is a block diagram that illustrates an electronic flash card generated by the training question card generator module 645 in which the record of FIG. 9 has been used to create a multiple choice question electronic flash card according to some embodiments of the inventive subject matter. FIG. 11 is a block diagram that illustrates an electronic flash card generated by the training question card generator module 645 in which the record of FIG. 9 has been used to create a short answer question electronic flash card according to some embodiments of the inventive subject matter.

Although FIG. 6 illustrates exemplary hardware/software architectures that may be used in data processing systems, such as the data processing system 500 of FIG. 5, for implementing the user paced learning server 415 in accordance with some embodiments of the inventive subject matter, it will be understood that the present invention is not limited to such a configuration but is intended to encompass any configuration capable of carrying out operations described herein. Moreover, the functionality of the data processing system 500 of FIG. 5 and the hardware/software architecture of FIG. 6 may be implemented as a single processor system, a multi-processor system, a multi-core processor system, or even a network of stand-alone computer systems, in accordance with various embodiments.

Computer program code for carrying out operations of data processing systems discussed above with respect to FIG. 6 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Figure 12:
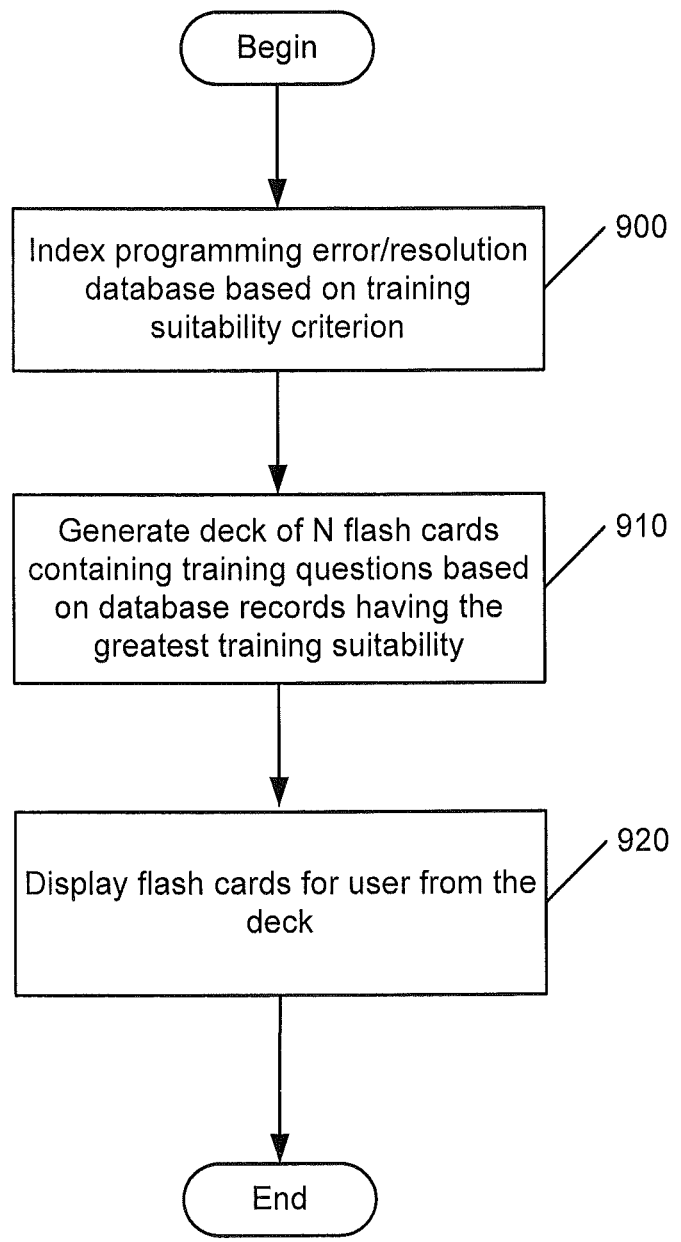
FIG. 12 is a flowchart that illustrates operations of a user paced learning environment based on historical programming errors and resolutions in accordance with some embodiments of the present inventive subject matter.

Operations of a user paced learning environment according to some embodiments of the inventive subject matter will now be described with respect to the flow chart of FIG. 12. A user wishing to begin a training session may select a topic via the user interface 630. The topic may be, for example, associated with a product, a project, a programming lesson or technique, or the like. In some embodiments, the user paced learning environment may incorporate security via, for example, a user login procedure. Once logged in via user name and password, for example, a user may generate decks of electronic flash cards for particular topics that the user has selected and/or may generate one or more decks of electronic flash cards for topics that the user's supervisor has assigned to the user. The user may also select the ratio of multiple choice questions to short answer questions to be presented by the electronic flash cards. At block 900, the indexer module 635 may index or order the programming error/resolution database 425 records for the topic based on one or more training suitability criteria. In accordance with various embodiments of the inventive subject matter, the training suitability criteria may include, but are not limited to, the following: an extent of code changes made for each respective one of the resolutions (preference may be given to resolutions involving fewer code changes as a flashcard may be more effective when the user is not asked to identify or make extensive code changes to answer a question); a distribution of locations in a program where the code changes are made (preference may be given to resolutions involving code changes within a limited area, such as a single function, method, data structure, or the like); a number of tags associated with each respective one of the resolutions indicating respective ones of the resolutions are helpful or relevant (preference may be given to resolutions tagged more often as being helpful or relevant as highly tagged resolutions may indicate that the type of error is often encountered and developers are able to use the exact resolution); ages associated with the resolutions, respectively (preference may be given to more recent resolutions as the risk that a resolution is no longer appropriate and/or the error unlikely to be encountered increases with time as the source code evolves); a number of similar error messages and locations associated with each respective one of the resolutions (preference may be given to those resolutions where the error location and the error message are similar as a high quantity of similar errors may indicate that an error is more likely to occur in the future); an indication that the respective one of the resolutions resulted in a successful compile of the program (preference may be given to resolutions that result in a clean compile or at least no new compile errors as the presence of new error messages may indicate a risk that the resolution is faulty); and/or a number of failed attempts at resolving each respective one of the programming errors.

At block 910, the training question card generator module 645 generates a deck of N flash cards that contains training questions based on the N records identified by the indexer module 635 as having the greatest training suitability based on the one or more training suitability criteria. In some embodiments, the user may select the number N based on the number of flash cards desired for a training session.

At block 920 the electronic flash cards are displayed on the user's device by sequencing through the flash cards in the deck in response to the user answering the respective question presented on each card. Based on the user's answers to these questions, a score may be generated based on the number of questions the user answered correctly and the user may be provided with the score to allow the user to evaluate how well the user is learning the material being presented. This score may also be communicated to a manager associated with the user to allow the manager to evaluate how well an employee, for example, is learning the material.

The embodiments of methods, systems, and computer program products described herein may provide a user paced learning environment that delivers questions for a particular topic through the use of electronic flash cards. The questions are based on a database of records for the topic that contains programming errors and associated resolutions to those errors. This may allow the user to more quickly become productive working on a legacy or established project or product as the user can be exposed to common errors and solutions that have arisen on this project or product.

The electronic flash cards can be delivered over the course of a whole day, for example, while the user is logged on to a computer. This more gradual approach to delivering the educational material may reduce the amount of distraction from the user's normal work tasks and may improve retention of the material being taught. This may be accomplished because the user is allowed to control the period between the presentation of the flash cards based on the rate at which the questions are answered thereby allowing the learning environment to be customized to the user's preferences and multi-tasking capability.

In other embodiments, the electronic flash cards may be downloaded to a client device as an application allowing the user to access the user paced learning functionality when operating a device in stand-alone mode without the need for a network connection. The user paced learning environment according to embodiments of the inventive subject matter may also become more valuable as more records are created in the program error/resolution database that cover additional topics.

Embodiments of the inventive subject matter may combine the uniqueness of a historical database of software or programming errors and solutions with the automatic generation of targeted and accurate training material. The user paced learning environment according to embodiments of the inventive subject matter may be targeted to the needs of training programmers or software developers on specific projects, products, or the like, not just the general syntax and constructs of a programming language.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

That which is claimed:

1. A method by a server of a computing system comprising:
   performing operations as follows on a processor of the server:
   receiving a request from a user device of the computing system to establish a training session, the request identifying a training topic and parameters of the training session;
   indexing a database of training records of the computing system based on the training topic and a training suitability criteria associated with each training record of the training records, each training record comprising programming errors and associated programming resolutions to the programming errors;
   selecting one or more training records from the indexed training records to generate one or more training questions based on a comparison of each of the associated programming resolutions of each of the training records and the training suitability criteria;
   generating one or more training questions to display as a deck of electronic flash cards on a user interface during the training session for each of the selected one or more training records based on the parameters of the training session received from the user device; and
   establishing the training session and displaying the one or more generated training questions as a deck of the electronic flash cards on the user interface during the established training session.

2. The method of claim 1, wherein selecting the one or more training records from the indexed training records comprises:
   comparing a field of each training record to the training suitability criteria, the field of each training record indicating a relevancy of the associated programming resolution to the programming error of each training record; and
   selecting the one or more training records based on the comparison.

3. The method of claim 1, wherein the training suitability criteria comprise at least two of:
   an extent of code changes made for each respective one of the programming resolutions;
   a distribution of locations in a program where the code changes are made;
   a number of tags associated with each respective one of the resolutions indicating respective ones of the programming resolutions are helpful;
   ages associated with the programming resolutions, respectively;
   a number of similar error messages and locations associated with each respective one of the programming resolutions;
   an indication that the respective one of the programming resolutions resulted in a successful compile of the program; and
   a number of failed attempts at resolving each respective one of the programming errors.

4. The method of claim 1, wherein the training topic is associated with a product.

5. The method of claim 1, wherein the training topic is associated with a programming lesson.

6. The method of claim 1, wherein generating the one or more training questions comprises generating the training questions to comprise multiple choice questions and short answer questions based on the parameters received from the user device.

7. The method of claim 6, further comprising:
   setting a ratio of multiple choice questions to short answer questions contained in the generated one or more training questions to display as a deck of electronic flash cards based on the parameters received from the user device.

8. The method of claim 1, wherein a number of training questions to display as a deck of electronic flash cards is represented by N, the method further comprising:
   setting a value of N based on the parameters received from the user device.

9. The method of claim 1, wherein each training record comprises:
   a field identifying a relevancy of the associated programming resolution to the programming error of each training record;
   one or more error messages associated with the programming error;
   failing programming code associated with the programming error; and/or
   correcting programming code associated with the programming resolution to the programming error.

10. The method of claim 1, further comprising:
    receiving answers from the user interface to the training questions displayed on the user interface as electronic flash cards during the established training session; and
    communicating a score to the user interface based on a number of the training questions answered correctly during the established training session.

11. The method of claim 10, further comprising:
    communicating the score to another user device operated by a manager associated with a user selecting the answers on the user interface.

12. A computing system comprising a server, the server comprising:
    a processor; and
    a memory coupled to the processor and comprising computer readable program code embodied in the memory that when executed by the processor causes the processor to perform operations comprising:
    receiving a request from a user device of the computing system to establish a training session, the request identifying a training topic and parameters of the training session;
    indexing a database of training records of the computing system based on the training topic and a training suitability criteria associated with each training record of the training records, each training record comprising programming errors and associated programming resolutions to the programming errors;

selecting one or more training records from the indexed training records to generate one or more training questions based on a comparison of each of the associated programming resolutions of each of the training records and the training suitability criteria;

generating one or more training questions to display as a deck of electronic flash cards on a user interface during the training session for each of the selected one or more training records based on the parameters of the training session received from the user device; and establishing the training session and displaying the one or more generated training questions as a deck of the electronic flash cards on the user interface during the established training session.

13. The system of claim 12, wherein selecting the one or more training records from the indexed training records comprises:
   comparing a field of each training record to the training suitability criteria, the field of each training record indicating a relevancy of the associated programming resolution to the programming error of each training record; and
   selecting the one or more training records based on the comparison.

14. The system of claim 12, wherein the training suitability criteria comprise at least two of:
   an extent of code changes made for each respective one of the programming resolutions;
   a distribution of locations in a program where the code changes are made;
   a number of tags associated with each respective one of the programming resolutions indicating respective ones of the resolutions are helpful;
   ages associated with the programming resolutions, respectively;
   a number of similar error messages and locations associated with each respective one of the programming resolutions;
   an indication that the respective one of the programming resolutions resulted in a successful compile of the program; and
   a number of failed attempts at resolving each respective one of the programming errors.

15. The system of claim 12, wherein the training topic is associated with a product.

16. The system of claim 12, wherein the training topic is associated with a programming lesson.

17. The system of claim 12, wherein generating the one or more training questions comprises generating the training questions to comprise multiple choice questions and short answer questions based on the parameters received from the user device.

18. The system of claim 17, wherein the operations further comprise:
   setting a ratio of multiple choice questions to short answer questions contained in the generated one or more training questions to display as a deck of electronic flash cards based on the parameters received from the user device.

19. The system of claim 12, wherein a number of training questions to display as a deck of electronic flash cards is represented by N, the operations further comprising:
   setting a value of N based on the parameters received from the user device.

20. The system of claim 12, wherein each training record comprises:
   a field identifying a relevancy of the associated programming resolution to the programming error of each training record;
   one or more error messages associated with the programming error;
   failing programming code associated with the programming error; and/or
   correcting programming code associated with the programming resolution to the programming error.

21. The system of claim 12, wherein the operations further comprise:
   receiving answers from the user interface to the training questions displayed on the user interface as electronic flash cards during the established training session; and
   communicating a score to the user interface based on a number of the training questions answered correctly during the established training session.

22. The system of claim 21, wherein the operations further comprise:
   communicating the score to another user device operated by a manager associated with a user selecting the answers on the user interface.

23. A computer program product, comprising:
   a tangible computer readable storage medium comprising computer readable program code embodied in the medium that when executed by a processor causes the processor to perform operations comprising:
   receiving a request from a user device of the computing system to establish a training session, the request identifying a training topic and parameters of the training session;
   indexing a database of training records of the computing system based on the training topic and a training suitability criteria associated with each training record of the training records, each training record comprising programming errors and associated programming resolutions to the programming errors;
   selecting one or more training records from the indexed training records to generate one or more training questions based on a comparison of each of the associated programming resolutions of each of the training records and the training suitability criteria;
   generating one or more training questions to display as a deck of electronic flash cards on a user interface during the training session for each of the selected one or more training records based on the parameters of the training session received from the user device; and
   establishing the training session and displaying the one or more generated training questions as a deck of the electronic flash cards on the user interface during the established training session.

24. The system of claim 23, wherein selecting the one or more training records from the indexed training records comprises:
   comparing a field of each training record to the training suitability criteria, the field of each training record indicating a relevancy of the associated programming resolution to the programming error of each training record; and
   selecting the one or more training records based on the comparison.

25. The system of claim 23, wherein the training suitability criteria comprise at least two of:
   an extent of code changes made for each respective one of the programming resolutions;
   a distribution of locations in a program where the code changes are made;

a number of tags associated with each respective one of the programming resolutions indicating respective ones of the resolutions are helpful;

ages associated with the programming resolutions, respectively;

a number of similar error messages and locations associated with each respective one of the programming resolutions;

an indication that the respective one of the programming resolutions resulted in a successful compile of the program; and a number of failed attempts at resolving each respective one of the programming errors.

26. The system of claim 23, wherein the training topic is associated with a product.

27. The system of claim 23, wherein the training topic is associated with a programming lesson.

28. The system of claim 23, wherein generating the one or more training questions comprises generating the training questions to comprise multiple choice questions and short answer questions based on the parameters received from the user device.

29. The system of claim 28, wherein the operations further comprise:

setting a ratio of multiple choice questions to short answer questions contained in the generated one or more training questions to display as a deck of electronic flash cards based on the parameters received from the user device.

30. The system of claim 23, wherein a number of training questions to display as a deck of electronic flash cards is represented by N, the operations further comprising:

setting a value of N based on the parameters received from the user device.

31. The system of claim 23, wherein each training record comprises:

a field identifying a relevancy of the associated programming resolution to the programming error of each training record;

one or more error messages associated with the programming error;

failing programming code associated with the programming error; and/or correcting programming code associated with the programming resolution to the programming error.

32. The system of claim 23, wherein the operations further comprise:

receiving answers from the user interface to the training questions displayed on the user interface as electronic flash cards during the established training session; and communicating a score to the user interface based on a number of the training questions answered correctly during the established training session.

33. The system of claim 32, wherein the operations further comprise:

communicating the score to another user device operated by a manager associated with a user selecting the answers on the user interface.

* * * * *